(12) United States Patent
Fujishige et al.

(10) Patent No.: US 11,964,806 B2
(45) Date of Patent: Apr. 23, 2024

(54) CAP

(71) Applicant: DAIWA CAN COMPANY, Tokyo (JP)

(72) Inventors: Eiji Fujishige, Sagamihara (JP); Kenji Takagi, Sagamihara (JP); Kenji Kawahara, Sagamihara (JP); Yukikazu Hiraide, Sagamihara (JP); Takashi Kawada, Sagamihara (JP)

(73) Assignee: DAIWA CAN COMPANY, Tokyo (JP)

( * ) Notice: Subject to any disclaimer, the term of this patent is extended or adjusted under 35 U.S.C. 154(b) by 0 days.

(21) Appl. No.: 17/728,113

(22) Filed: Apr. 25, 2022

(65) Prior Publication Data
US 2022/0250814 A1 Aug. 11, 2022

Related U.S. Application Data

(63) Continuation of application No. PCT/JP2020/039608, filed on Oct. 21, 2020.

(30) Foreign Application Priority Data

Oct. 31, 2019 (JP) .................................. 2019-198539

(51) Int. Cl.
*B65D 55/00* (2006.01)
*B65D 41/04* (2006.01)

(52) U.S. Cl.
CPC ........... *B65D 55/00* (2013.01); *B65D 41/045* (2013.01); *B65D 2251/205* (2013.01)

(58) Field of Classification Search
CPC .............. B65D 41/045; B65D 225/045; B65D 2251/205; B65D 53/04; C09D 167/00; C09D 191/06; C09D 191/08

(Continued)

(56) References Cited

U.S. PATENT DOCUMENTS 4,917,949 A * 4/1990 Yousif ..................... B32B 27/12
  428/416
6,217,994 B1 * 4/2001 Tanaka ................. C09D 167/00
  428/458

(Continued)

FOREIGN PATENT DOCUMENTS

CN 101039849 A 9/2007
CN 101891031 A 11/2010

(Continued)

OTHER PUBLICATIONS

International Preliminary Report on Patentability dated May 12, 2022 and Written Opinion of the International Searching Authority dated Dec. 15, 2020 received in PCT/JP2020/039608.

(Continued)

*Primary Examiner* — Ernesto A Grano
(74) *Attorney, Agent, or Firm* — Scully, Scott, Murphy & Presser, P.C.

(57) ABSTRACT

A cap comprising a cap body including a top plate portion which is disk-shaped, and a skirt portion which is cylindrical and provided at a peripheral edge portion of the top plate portion, the top plate portion including a substrate and a resin coating film provided on a cap inner surface side of the substrate, the resin coating film including a polyester-based resin and a lubricant, and a sealing member provided in the cap body separately from the cap body so as to face the top plate portion, and having an outer diameter smaller than an inner diameter of the skirt portion.

14 Claims, 6 Drawing Sheets

(58) Field of Classification Search
USPC .......................................................... 215/341
See application file for complete search history.

(56) References Cited

U.S. PATENT DOCUMENTS

| | | | | |
|---|---|---|---|---|
| 7,648,764 | B2* | 1/2010 | Yousif | B32B 7/06 428/35.8 |
| 7,850,033 | B2* | 12/2010 | Thorstensen-Woll | B65D 53/04 220/359.3 |
| 2008/0041810 | A1 | 2/2008 | Itoh et al. | |
| 2010/0065528 | A1* | 3/2010 | Hanafusa | B65D 41/045 215/349 |
| 2016/0052678 | A1* | 2/2016 | Hanafusa | B65D 41/045 215/347 |
| 2018/0111712 | A1* | 4/2018 | Nyuu | C08J 7/065 |
| 2018/0162595 | A1* | 6/2018 | Komatsu | B32B 27/306 |

FOREIGN PATENT DOCUMENTS

| | | |
|---|---|---|
| JP | 2004-217295 A | 8/2004 |
| JP | 2005-288952 A | 10/2005 |
| JP | 2006-008226 A | 1/2006 |
| JP | 2007-076720 A | 3/2007 |
| JP | 2007-246802 A | 9/2007 |
| JP | 2009-208795 A | 9/2009 |
| JP | 2016-182991 A | 10/2016 |
| JP | 2017-159965 A | 9/2017 |
| JP | 2017-178421 A | 10/2017 |
| JP | 2017-178427 A | 10/2017 |
| JP | 6534377 B2 | 6/2019 |

OTHER PUBLICATIONS

International Search Report dated Dec. 15, 2020 received in PCT/JP2020/039608.
Chinese Office Action dated May 31, 2023 received in 202080075858.8.
Japanese Office Action dated Aug. 8, 2023 received in 2019-198539.
Japanese Office Action dated Dec. 12, 2023 received in 2019-198539.

* cited by examiner

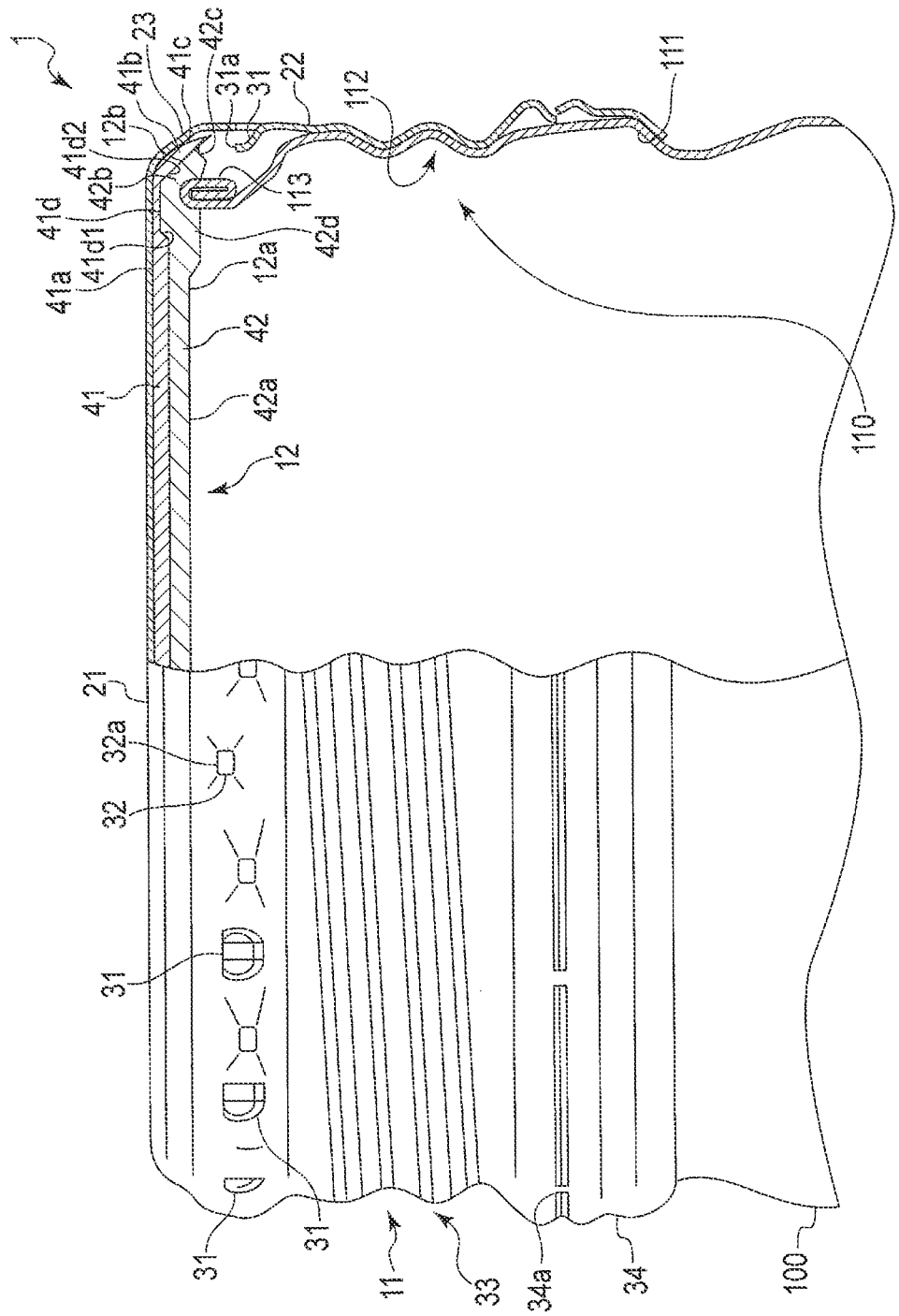
F I G. 1

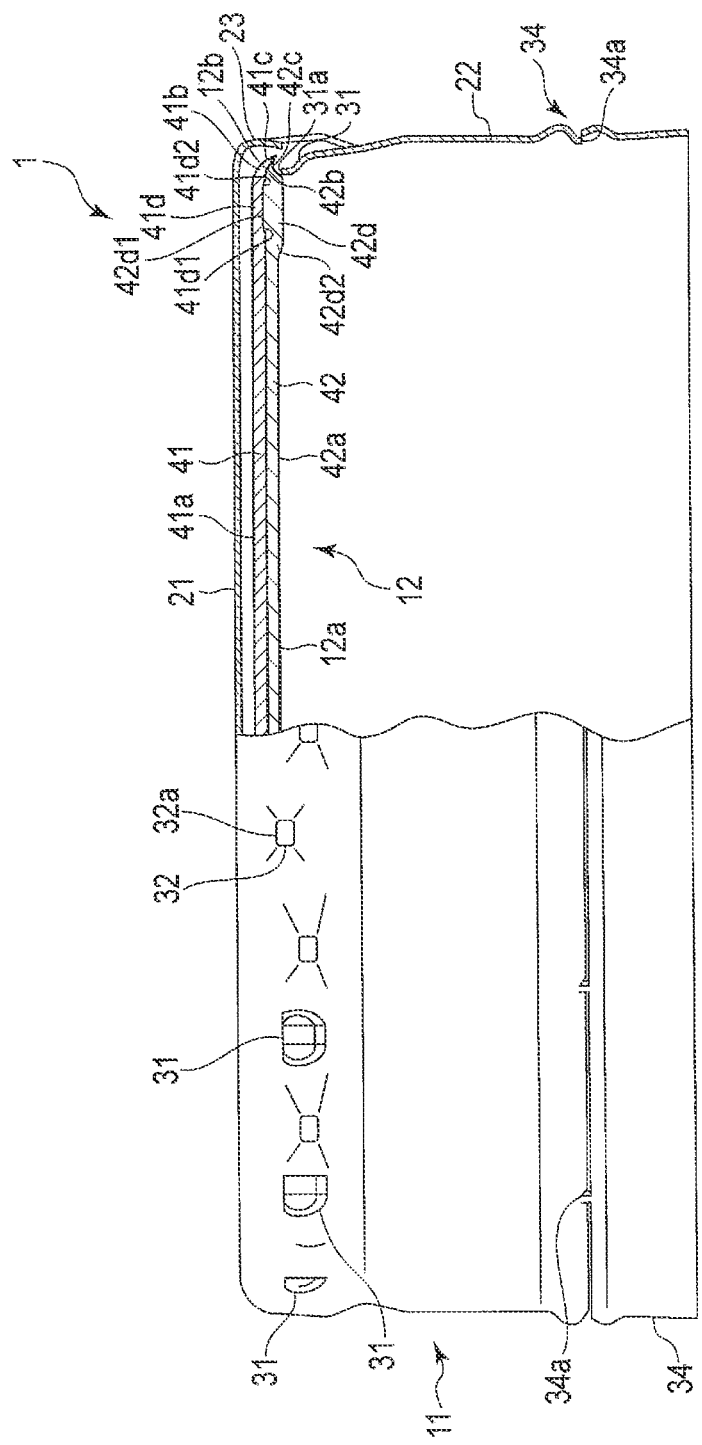
F I G. 2

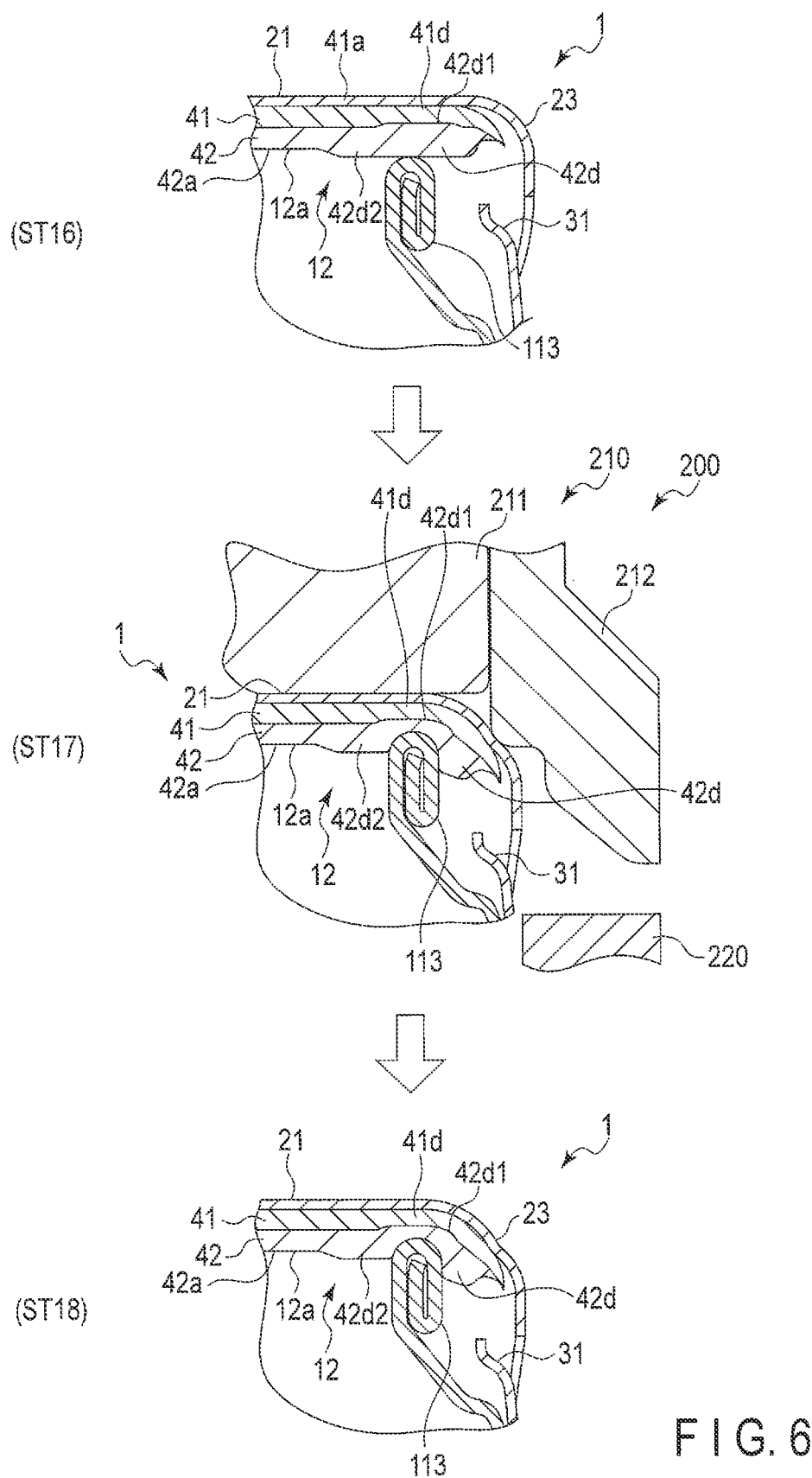
F I G. 6

CAP

CROSS-REFERENCE TO RELATED APPLICATIONS

This application is a Continuation Application of PCT Application No. PCT/JP2020/039608 filed Oct. 21, 2020 and based upon and claiming the benefit of priority from Japanese Patent Application No. 2019-198539 filed Oct. 31, 2019, the entire contents of which are incorporated herein by reference.

BACKGROUND OF THE INVENTION

1. Field of the Invention

The present invention relates generally to a cap for closing a can container.

2. Description of the Related Art

Conventionally, a coating material containing an epoxy-based resin such as an epoxy phenol resin as a main component is often used as an inner surface coating material of a metal cap that seals a mouth portion of a can container (for example, refer to Patent Literatures 1 and 2). On the other hand, there is known a cap including a cap body made of a metal and a resin sealing member separately provided in the cap body in order to reduce opening torque when the cap is opened (for example, see Patent Literatures 3 and 4).

CITATION LIST

Patent Literature

Patent Literature 1: Jpn. Pat. Appln. KOKAI Publication No. 2009-208795
Patent Literature 2: Japanese Patent No. 6534377
Patent Literature 3: Jpn. Pat. Appln. KOKAI Publication No. 2004-217295
Patent Literature 4: Jpn. Pat. Appln. KOKAI Publication No. 2017-178421

BRIEF SUMMARY OF THE INVENTION

In the caps described in Patent Literatures 3 and 4, it is considered that friction between an inner surface of a top plate portion of the cap body and a sealing member has a great influence on opening performance. Therefore, the present inventors attempted to reduce the friction by adding a lubricant to the inner surface coating material of the cap body. Specifically, the present inventors have found a problem wherein when a lubricant is added to a coating material made of an epoxy phenol resin as an inner surface coating material of a cap body, a friction reducing effect of the lubricant is not exhibited and the opening torque of the cap cannot be sufficiently reduced (see Example 8 of [Working Examples] described later).

Accordingly, an object of the present invention is to solve the problem described above and to provide a cap having an excellent opening performance.

The present inventors have newly found that when a lubricant is added to a coating material made of a polyester-based resin, a friction reducing effect of the lubricant is exhibited and the opening torque of the cap can be reduced, and have achieved the present invention.

According to the present invention, there is provided a cap comprising:
a cap body including a top plate portion which is disk-shaped, and a skirt portion which is cylindrical and provided at a peripheral edge portion of the top plate portion, the top plate portion including a substrate and a resin coating film provided on a cap inner surface side of the substrate, the resin coating film including a polyester-based resin and a lubricant; and
a sealing member provided in the cap body separately from the cap body so as to face the top plate portion, and having an outer diameter smaller than an inner diameter of the skirt portion.

According to the present invention, a cap having excellent opening performance is provided.

BRIEF DESCRIPTION OF THE SEVERAL VIEWS OF THE DRAWING

FIG. 1 is a side view showing a partial cross-section of a configuration of a cap according to an embodiment of the present invention and a mouth portion of a can container.
FIG. 2 is a side view showing a partial cross-section of a configuration of the cap.
FIG. 6 is a flow chart schematically showing a part of the method for manufacturing the cap.

DETAILED DESCRIPTION OF THE INVENTION

Hereinafter, a cap 1 according to an embodiment of the present invention will be described with reference to FIGS. 1 to 4. The description is intended to illustrate the present invention but not to limit the present invention.

Figure 3:
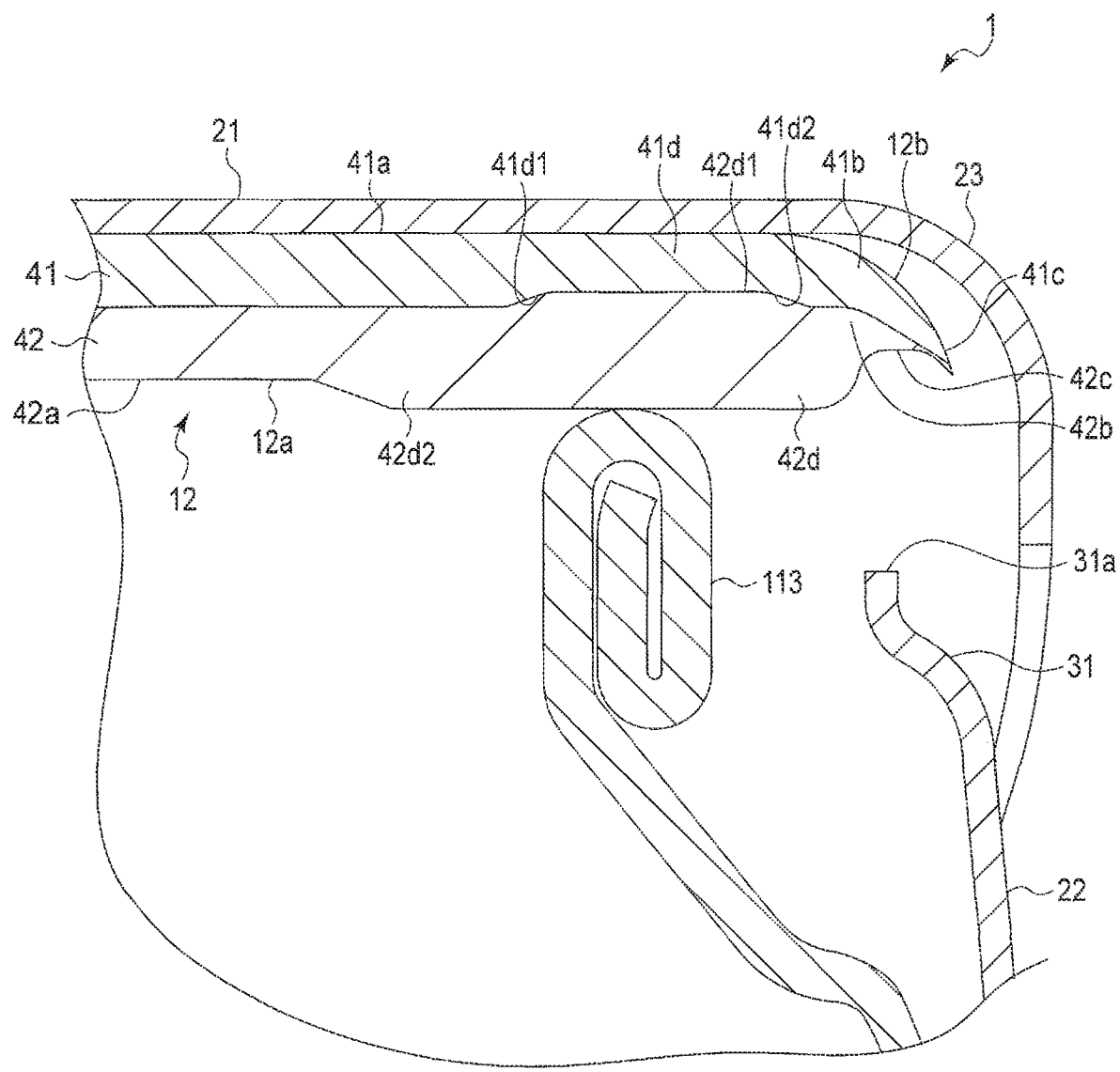
FIG. 3 is a cross-sectional view showing the configuration of the cap.
Figure 4:
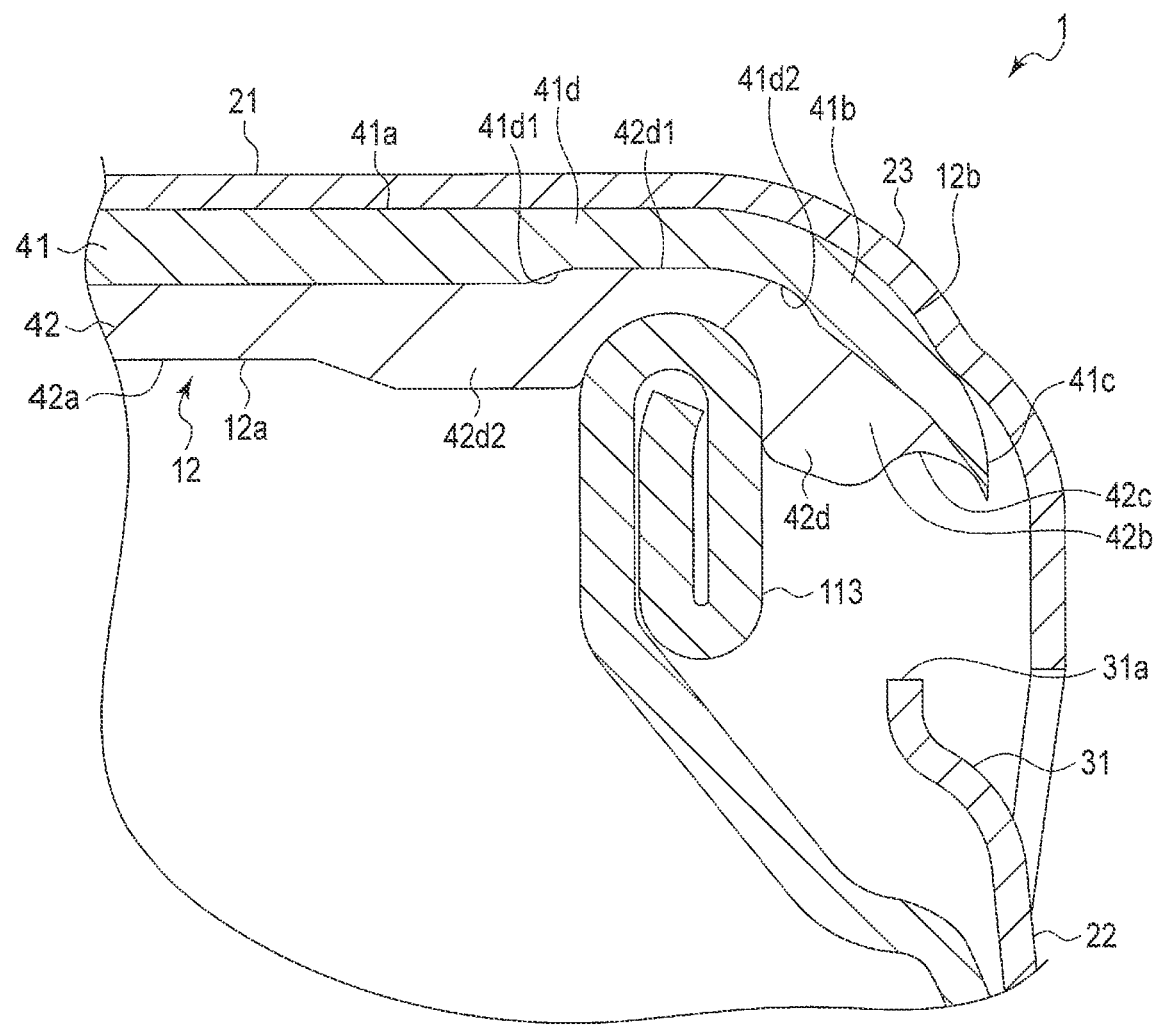
FIG. 4 is a cross-sectional view showing the configuration of the cap.

FIG. 1 is a side view showing a partial cross-section of a configuration of a cap according to the embodiment of the present invention and a mouth portion of a can container. FIG. 2 is a side view showing a partial cross-section of a configuration of the cap 1. FIG. 3 is a cross-sectional view showing a configuration of the cap 1 before the cap 1 is fixed by seaming process to the can container 100. FIG. 4 is a cross-sectional view showing a configuration of the cap 1 after the cap 1 is fixed by seaming process to the can container 100.

As shown in FIG. 1, the cap 1 is attached to a mouth portion 110 of the can container 100, and is fixed by seaming process by drawing in a state of covering the mouth portion 110 of the can container 100, thereby sealing the can container 100. By sealing the can container 100, the cap 1 constitutes a bottle-shaped can together with the can container 100 in which liquid such as beverage is sealed and filled.

Here, the can container 100 is a so-called bottle-shaped container that contains a beverage or the like. For example, the can container 100 is made of a metal material, such as an aluminum alloy or a surface-treated steel plate, having resin films laminated on both surfaces thereof. The can container 100 is formed in a cylindrical shape having a different outer diameter with one end reduced in diameter. The can container 100 has the mouth portion 110 at one end for discharging the contained beverage. The mouth portion 110 has a jaw portion 111, a male screw portion 112, and a curl portion 113 on the outer peripheral surface thereof from the bottom surface side of the can container 100 toward the end portion.

The jaw portion 111 is configured to protrude annularly. The curl portion 113 is formed to have a smaller diameter than the male screw portion 112. The curl portion 113 is configured to be smaller than the inner diameter of the cap 1. The curl portion 113 is formed by folding the end portion of the mouth portion 110 once or more. The curl portion 113 forms an opening through which the beverage contained in the can container 100 is discharged.

As shown in FIG. 1 to FIG. 4, the cap 1 includes a cap body 11 and a sealing member 12 provided separately in the cap body 11.

The cap body 11 is made of a material obtained by forming a resin coating film on a metal material such as an aluminum alloy. In the present embodiment, a specific resin coating film is provided on an inner surface side of the cap body 11. The resin coating film will be described in detail later. The cap body 11 is formed by drawing such a thin plate-shaped material into a cup shape and then performing each of knurling, roll-on shaping, etc.

The cap body 11 includes a disk-shaped top plate portion 21 and a cylindrical skirt portion 22 provided integrally with a peripheral edge portion of the top plate portion 21. In the cap body 11, the top plate portion 21 and the skirt portion 22 are integrally and continuously formed by an annular and curved corner portion 23.

The top plate portion 21 is formed in a disk shape and has a flat main surface. One end of the skirt portion 22 is continuous with the top plate portion 21 via the corner portion 23, and the other end is open. The skirt portion 22 includes a plurality of knurl portions 31 including vent slits 31a, a plurality of recesses 32, a female screw portion 33, and a tamper evidence band portion 34 from an end portion on the top plate portion 21 side to an opened end portion.

The top plate portion 21 includes a substrate and a resin coating film (hereinafter also referred to as an inner resin coating film) provided on a cap inner surface side of the substrate, and the inner resin coating film contains a polyester-based resin and a lubricant. Specifically, the inner resin coating film contains a polyester-based resin as a main component and a lubricant as an additive. The inner resin coating film may further contain an additive other than a lubricant as necessary. The resin coating film can be formed on the substrate by a known method, for example, baking coating. Note that the top plate portion 21 may include a known resin coating film such as an epoxy phenol resin or a polyester resin on a cap outer surface side of the substrate. Printing may be performed on the cap outer surface side of the substrate.

As described above, the substrate is typically a metal substrate made of an aluminum alloy or the like.

A polyester-based resin generally for use in forming a resin coating film of a bottle-shaped can may be used as the polyester-based resin for forming the inner resin coating film, and is commercially available. The polyester-based resin refers to a resin made of polyester.

The inner resin coating film contains a lubricant in addition to the polyester-based resin. The lubricant preferably contains a hydrocarbon-based wax. Since the hydrocarbon-based wax is present in a dispersed state in the form of solid particles in the resin coating film, it can also be referred to as "dispersed wax" or "particulate wax". The hydrocarbon-based wax is preferably a polyethylene wax. The hydrocarbon-based wax is added in an amount of, for example, about 2% to about 7% by mass, and preferably about 3% to about 7% by mass, with respect to the polyester-based resin. When the hydrocarbon-based wax is used as the lubricant, it is possible to significantly reduce the opening torque of the cap 1 and significantly improve the opening performance of the cap 1.

A mechanism by which the hydrocarbon-based wax can exhibit a significantly excellent effect will be discussed below. The hydrocarbon-based wax has a high melting point and is considered to be present in a dispersed state in the form of solid particles in the resin coating film even when heated during cap manufacturing. Therefore, it is considered that the hydrocarbon-based wax can form irregularities on the surface of the inner resin coating film containing the polyester-based resin as a main component, and that the irregularities bring the contact between the inner resin coating film and the can container 100 into a point contact state instead of a surface contact state, thereby promoting the sliding between the inner resin coating film and the can container 100. In addition, since the cross-linking density of the polyester-based resin is low, it is considered that the polyester-based resin flexibly follows the solid particles of the hydrocarbon-based wax during cap shaping, and that the solid particles of the hydrocarbon-based wax can be stably held without falling off from the surface of the resin coating film.

On the other hand, when the inner resin coating film is formed by adding the hydrocarbon-based wax to the epoxy phenol resin, since the epoxy phenol resin has a higher cross-linking density than the polyester-based resin, the epoxy phenol resin has low flexibility and it is thus difficult to stably hold the solid particles of the hydrocarbon-based wax on the surface of the resin coating film, particularly during cap shaping, and the solid particles of the hydrocarbon-based wax are likely to fall off from the surface of the resin coating film.

When a hydrocarbon-based wax is used as the lubricant, the hydrocarbon-based wax may be used alone or in combination with another lubricant. As another lubricant, a fatty acid ester-based wax can be used. Since the fatty acid ester-based wax is present in the resin coating film in either a molten state or a solidified state depending on the temperature, it can also be referred to as a "molten wax". The fatty acid ester-based wax is preferably lanolin. The fatty acid ester-based wax is added in an amount of, for example, about 2% to about 7% by mass, and preferably about 3% to about 7% by mass, with respect to the polyester-based resin. When the hydrocarbon-based wax is used in combination with the fatty acid ester-based wax as the lubricant, the 2nd torque (that is, the torque at the time of breakage of breaking portions 34a of the tamper evidence band portion 34 of the cap described later) can be further reduced and the opening performance of the cap can be further improved as compared to the case where the hydrocarbon-based wax is used alone. Since the fatty acid ester-based wax is likely to exist in a molten state and has an effect of reducing the dynamic friction coefficient, the 2nd torque can be reduced by reducing the frictional resistance during the opening operation of the cap.

The mechanism by which the fatty acid ester-based wax can exhibit the above-described effects when used in combination with the hydrocarbon-based wax will be discussed below. The fatty acid ester-based wax has a low melting point of, for example, 40° C., and can be volatilized from the surface of the resin coating film during heating in cap manufacturing (for example, during drying in an oven when printing is performed on the outer surface side of the cap).

It is considered that even if the fatty acid ester-based wax volatilizes from the surfaces of the resin coating film, the fatty acid ester-based wax present inside the resin coating film seeps out to the surface due to the low cross-linking density of the polyester-based resin constituting the resin coating film, thereby making it possible to further promote the sliding between the inner resin coating film and the can container 100 during opening of the cap. In addition, it is considered that the fatty acid ester-based wax contributes to dispersion of the solid particles of the hydrocarbon-based wax in the resin coating film, and also contributes to prevention of the solid particles of the hydrocarbon-based wax from falling off from the surface of the resin coating film during cap shaping.

On the other hand, when an inner resin coating film is formed by adding a fatty acid ester-based wax to an epoxy phenol resin, since the cross-linking density of the epoxy phenol resin is higher than that of the polyester-based resin, it is considered that the fatty acid ester-based wax present inside the resin coating film hardly seeps out to the surface, and the effect as a lubricant cannot be exhibited.

As shown in FIGS. 1 and 2, the plurality of knurl portions 31, the plurality of recesses 32, the female screw portion 33, and the tamper evidence band portion 34 are formed through processing, such as knurling or roll-on shaping, of a cup-shaped product including the top plate portion 21, the cylindrical skirt portion 22 in which the knurl portions 31, the recesses 32, the female screw portion 33, and the tamper evidence band portion 34 are not formed, and the corner portion 23.

The knurl portion 31 has a vent slit 31a and protrudes from the inner peripheral surface of the skirt portion 22. In other words, the knurl portion 31 constitutes a protrusion in which a portion of the inner peripheral surface of the skirt portion 22 is cut out by recessing a portion of the skirt portion 22 inward in a radial direction of the skirt portion 22.

The plurality of knurl portions 31 are provided in the circumferential direction of the skirt portion 22. The vent slit 31a is a cut for discharging gas or the like in the can container 100 at the time of opening. The vent slit 31a is formed by cutting an end portion of the knurl portion 31 on the top plate portion 21 side.

The diameter of a tangent circle connecting the ends of the knurl portions 31 on the vent slit 31a side, in other words, the ends of the knurl portions 31 on the top plate portion 21 side, is set smaller than the outer diameter of the sealing member 12. For this reason, the plurality of knurl portions 31 constitute locking portions that restrict movement of the sealing member 12 disposed on the top plate portion 21 in a direction away from the top plate portion 21.

The recesses 32 are formed by recessing parts of the skirt portion 22 from the outer peripheral surface side toward the inner peripheral surface side. Specifically, each recess 32 constitutes a protrusion on the inner peripheral surface of the skirt portion 22 with a part of the skirt portion 22 being recessed inward in the radial direction of the skirt portion 22.

The recess 32 has an inclined surface 32a on an inner side of the skirt portion 22. The inclined surface 32a is inclined in a direction away from the top plate portion 21 in an axial direction and inward in the radial direction. In other words, the height of the recess 32 from the inner peripheral surface of the skirt portion 22 increases as the distance from the top plate portion 21 increases, so that the inner surface of the recess 32 is inclined.

A plurality of recesses 32 are provided, preferably three or more, and in the present embodiment, four. For example, the recesses 32 are disposed at substantially equal intervals along the circumferential direction of the skirt portion 22. The diameter of a tangent circle connecting the inclined surfaces 32a of the recesses 32 is constituted to be equal to the outer diameter of the sealing member 12 at least in part in the axial direction. In other words, the inclined surfaces 32a are configured to be able to come into contact with the outer peripheral edge of the sealing member 12 in part in the axial direction, and constitute restricting portions that restrict movement of the sealing member 12 in contact with the inclined surfaces 32a in the radial direction and that perform positioning of the sealing member 12 in the radial direction. That is, the recesses 32 perform centering of the sealing member 12 abutting on the inclined surfaces 32a with respect to the cap body 11. Further, the diameter of a tangent circle connecting the lowermost ends of the inclined surfaces 32a in the axial direction is set to be larger than the diameter of a tangent circle connecting the radially innermost ends of the ends of the knurl portions 31 on the vent slit 31a side.

In addition, of the recesses 32, at least a portion of the inclined surfaces 32a constituting the same diameter as the outer diameter of the sealing member 12 is located closer to the top plate portion 21 in the axial direction of the skirt portion 22 than the locking portions constituted by the ends of the knurl portions 31 on the vent slit 31a side. For example, the recesses 32 are disposed in the circumferential direction of the skirt portion 22 together with the knurl portions 31, and are disposed closer to the top plate portion 21 in the axial direction of the skirt portion 22 than the knurl portions 31.

In the present embodiment, the knurl portions 31 are provided at thirteen locations, and the recesses 32 are provided at four locations. For example, in the circumferential direction of the skirt portion 22, three knurl portions 31 are arranged at three locations, four knurl portions 31 are arranged at one location, and one recess 32 is arranged between the rows of the knurl portions 31. Further, in the present embodiment, the recesses 32 are disposed closer to the top plate portion 21 than the knurl portions 31 of the skirt portion 22.

The female screw portion 33 is configured to be screwable with the male screw portion 112 of the can container 100. The female screw portion 33 is shaped together with the can container 100. In other words, the female screw portion 33 is not shaped in the cap 1 before being attached to the can container 100, but is shaped when integrally joined with the can container 100.

The tamper evidence band portion 34 engages with the jaw portion 111 of the can container 100 in a direction in which the cap 1 is separated from the can container 100 and in an axial direction of the cap 1. In addition, the tamper evidence band portion 34 has the breaking portions 34a, which are broken and detached from the skirt portion 22 when the cap 1 is opened. Thus, the tamper evidence band portion 34 is configured by forming a slit on the end portion side of the skirt portion 22 while leaving the breaking portions 34a, and is formed into the shape of the jaw portion 111 of the can container 100 so that it can be engaged with the jaw portion 111 when integrally joined with the can container 100, similarly to the female screw portion 33.

The corner portion 23 is, for example, an annular corner portion whose cross-sectional shape is curved at one center of curvature before the cap body 11 is fixed by seaming process to the mouth portion 110 of the can container 100. The corner portion 23, at the time of drawing when the cap body 11 is fixed by seaming process to the mouth portion 110 of the can container 100, is formed into, for example, an annular corner portion whose cross-sectional shape is curved at at least two centers of curvature by a part of the corner portion 23 being pressed in the axial direction in an annular shape along the circumferential direction.

The sealing member 12 is formed separately from the cap body 11. That is, the sealing member 12 is disposed to face the top plate portion 21 and the skirt portion 22, and is not bonded to the cap 1. Specifically, the sealing member 12 is formed in a disk shape and has an outer diameter larger than the diameter of the inscribed circle of the knurl portions 31 provided in the skirt portion 22 of the cap body 11. Further, the sealing member 12 has an outer diameter equal to the diameter of at least some of the inclined surfaces 32a of the recesses 32 protruding radially from the inner peripheral surface of the skirt portion 22, specifically, the diameter of the inscribed circle of the central portion in the axial direction of the inclined surfaces 32a.

The sealing member 12 is provided integrally with the cap body 11 by being engaged in the axial direction of the cap body 11 with the end portions provided with the vent slits 31a of the knurl portions 31 protruding in the radial direction from the inner peripheral surface of the skirt portion 22. In addition, centering is performed so that the center of the sealing member 12 is positioned on the axial line of the cap body 11 by being engaged in the radial direction of the cap body 11 with the inclined surfaces 32a of the recesses 32 protruding in the radial direction from the inner peripheral surface of the skirt portion 22.

The sealing member 12 includes a disk-shaped sliding layer 41 and a disk-shaped sealing layer 42 integrally laminated on the sliding layer 41. The sealing member 12 is configured by integrally molding the sliding layer 41 and the sealing layer 42 with different resin materials. The sealing member 12 includes a flat plate portion 12a having a uniform thickness, and a curved surface portion 12b in which an outer surface of an outer peripheral edge on the top plate portion 21 side is formed of a curved surface.

In other words, the sealing member 12 is formed in a disk shape, and the ridge portion on the top plate portion 21 side is configured by a curved surface having a predetermined curvature. Furthermore, the sealing member 12 is configured such that the curved surface portion 12b constituting the outer peripheral edge side is thinner than the flat plate portion 12a, and the curved surface portion 12b becomes gradually thinner from the center side toward the outer peripheral edge, and the distal end, namely, the outer peripheral edge of the curved surface portion 12b, is configured to be thinnest among other portions.

The flat plate portion 12a configures a sealing portion in which a part on the curved surface portion 12b side abuts on the mouth portion 110 of the can container 100. The flat plate portion 12a is configured such that the sealing portion that comes in contact with the mouth portion 110 of the can container 100 is thicker than the other portions.

The sliding layer 41 is made of a resin material whose hardness is relatively higher (harder) than that of the sealing layer 42. The sliding layer 41 is made of a resin material that does not have adhesiveness and tackiness to the inner resin coating film of the cap body 11. That is, the sliding layer 41 is not bonded to the top plate portion 21 and slides on the top plate portion 21 in a state of being in contact with the top plate portion 21.

Examples of the resin material used for the sliding layer 41 include olefin-based resins such as polypropylene resin and polyethylene resin, polyester-based resins such as polyethylene terephthalate, styrene-based resins, and acrylic-based resins. In the present embodiment, the sliding layer 41 is made of, for example, polypropylene resin. A pigment, a lubricant, a softener, and the like can be appropriately added to the resin material used for the sliding layer 41.

As shown in FIG. 1 to FIG. 4, the sliding layer 41 is provided separately from the cap body 11 in a manner facing the top plate portion 21 of the cap body 11. The sliding layer 41 is configured to be slidable with the top plate portion 21 of the cap body 11 due to the resin material that is used. The sliding layer 41 is formed in a disk shape. The outer diameter of the sliding layer 41 is smaller than the inner diameter of the skirt portion 22, larger than the inscribed circle of the knurl portions 31, and larger than the outer diameter of the curl portion 113 of the mouth portion 110.

The sliding layer 41 includes a first flat plate portion 41a, a first curved surface portion 41b in which an outer surface of an outer peripheral edge on the top plate portion 21 side is formed of a curved surface, a protruding portion 41c provided on the sealing layer 42 side of the first curved surface portion 41b, and a thin portion 41d provided on the first flat plate portion 41a. The first flat plate portion 41a is configured such that the portion from the center of the sliding layer 41 to the outer peripheral side of a portion facing the curl portion 113 of the mouth portion 110 has a uniform thickness except for the thin portion 41d.

The first curved surface portion 41b is curved on the top plate portion 21 side, so that the thickness of a portion from the outer peripheral side of a portion facing the curl portion 113 of the mouth portion 110 to the outer peripheral edge gradually decreases toward the outer peripheral edge. Furthermore, for example, in the first curved surface portion 41b, a portion adjacent to the first flat plate portion 41a is the same in thickness as the first flat plate portion 41a and is thicker than the thin portion 41d.

The protruding portion 41c is provided on the opening side of the skirt portion 22 on the outer peripheral edge of the first curved surface portion 41b. The protruding portion 41c is configured in an annular protrusion shape that is inclined with respect to the axial direction of the sliding layer 41 and the surface direction of the top plate portion 21 and is curved or inclined toward the opening end portion side of the skirt portion 22. The thickness of the protruding portion 41c gradually decreases from the first curved surface portion 41b toward the distal end.

The thin portion 41d is provided on the main surface of the first flat plate portion 41a on the opening side of the skirt portion 22. The thin portion 41d is an annular recess in which the main surface on the opening side of the skirt portion 22 is configured to be parallel to the main surface of the first flat plate portion 41a on the opening side of the skirt portion 22. The thin portion 41d is continuous with the first flat plate portion 41a and the first curved surface portion 41b at inclined surfaces 41d1 and 41d2 inclined with respect to the main surface of the thin portion 41d.

That is, since the thin portion 41d is continuous with portions adjacent to the thin portion 41d on the radially inner and outer sides at the inclined surfaces 41d1 and 41d2, the portions adjacent to the thin portion 41d on the radially inner and outer sides are thicker than the thin portion 41d. In the present embodiment, the portions adjacent to the radially inner and outer sides of the thin portion 41d are the portion of the first flat plate portion 41a, excluding the thin portion 41d, and the first curved surface portion 41b.

To be more specific, the main surface of the thin portion 41d and the main surface of the first flat plate portion 41a are made continuous by the inclined surface 41d1 which is annular. Here, the inclination angle of the inclined surface 41*d*1 can be appropriately set as long as the inclined surface 41*d*1 can guide the resin material of the sealing layer 42 to the thin portion 41*d*.

Further, the main surface of the thin portion 41*d* and the main surface of the first curved surface portion 41*b* are made continuous by the inclined surface 41*d*2 which is annular. Here, the inclination angle of the inclined surface 41*d*2 can be appropriately set as long as the inclined surface 41*d*2 can guide the resin material of the sealing layer 42 to the thin portion 41*d*.

The thin portion 41*d* is provided on the main surface side of the first flat plate portion 41*a* opposite to the top plate portion 21, that is, on the main surface side on which the sealing layer 42 is laminated. In a state where the sealing member 12 is disposed in the cap body 11, the thin portion 41*d* is provided at a position facing a base point of deformation of the top plate portion 21 when the cap 1 is attached to the can container 100 and drawing of the corner portion 23 of the cap body 11 is performed. Furthermore, the thin portion 41*d* is provided at a position adjacent to a portion of the sealing layer 42 facing the mouth portion 110 in the axial direction when the cap 1 is attached to the can container 100.

The thin portion 41*d* has such a width in the radial direction that enables the thin portion to be in a position that faces the base point of deformation of the top plate portion 21 at the time of performing drawing and in a position that faces the mouth portion 110 of the can container 100 in the axial direction, when the sealing member 12 is disposed in the cap body 11 and the cap 1 is placed on the mouth portion 110 of the can container 100. Here, the width of the thin portion 41*d* in the radial direction is appropriately set in consideration of the difference between the inner diameter of the cap body 11 and the outer diameter of the sealing member 12, the shrinkage rate of the resin material configuring the sliding layer 41 and the sealing layer 42 of the sealing member 12, the amount of deformation of the sliding layer 41 due to external forces, dimensional accuracy, and the like.

The sealing layer 42 is made of a resin material whose hardness is relatively lower (softer) than that of the sliding layer 41. Examples of the resin material used for the sealing layer 42 include an olefin-based resin, a polyester-based resin, a styrene-based resin, and an acrylic-based resin, and more preferably include a blend material of a styrene-based elastomer and a polypropylene resin, a blend material of a low-density polyethylene and a styrene-based elastomer, and a polyester-based elastomer. In the present embodiment, the sealing layer 42 is made of, for example, a mixed material of a styrene-based elastomer and a polypropylene resin. A pigment, a lubricant, a softener, and the like can be appropriately added to the resin material used for the sealing layer 42.

As shown in FIG. 1 to FIG. 4, the sealing layer 42 is integrally provided on the main surface of the sliding layer 41 on the side facing the mouth portion 110. The sealing layer 42 is formed in a disk shape. The outer diameter of the sealing layer 42 is configured to be larger than the outer diameter of the curl portion 113 of the mouth portion 110, and is configured to be substantially the same as the outer diameter of the sliding layer 41.

As shown in FIG. 3, the sealing layer 42 includes a second flat plate portion 42*a* whose portion facing the mouth portion 110 is thicker than other portions, a second curved surface portion 42*b* whose outer surface of the outer peripheral edge on the top plate portion 21 side is a curved surface, an annular recess 42*c* provided on the main surface of the second curved surface portion 42*b* on the side opposite to the sliding layer 41 side, and a thick portion 42*d* provided on the second flat plate portion 42*a*. The second flat plate portion 42*a* has a flat main surface facing the curl portion 113. For example, the second flat plate portion 42*a* has the same diameter as the first flat plate portion 41*a* of the sliding layer 41. The second flat plate portion 42*a* configures the flat plate portion 12*a* of the sealing member 12 together with the first flat plate portion 41*a*.

The second curved surface portion 42*b* has, for example, a main surface flush with a main surface of the second flat plate portion 42*a* facing the curl portion 113. The second curved surface portion 42*b* is configured in a manner such that the thickness of a portion from the outer peripheral side of a portion facing the curl portion 113 of the mouth portion 110 to the outer peripheral edge is made gradually thinner toward the outer peripheral edge. The second curved surface portion 42*b* is stacked on the first curved surface portion 41*b* and the protruding portion 41*c*. The second curved surface portion 42*b* configures the curved surface portion 12*b* of the sealing member 12 together with the first curved surface portion 41*b* and the protruding portion 41*c*.

The recess 42*c* is, for example, an annular recess having a semi-circular cross section. When the sealing member 12 is disposed in the cap body 11, the recess 42*c* comes into contact with, for example, end portions of the knurl portions 31 on the vent slit 31*a* side.

The thick portion 42*d* corresponds to annular protrusions 42*d*1 and 42*d*2 protruding from both main surfaces of the second flat plate portion 42*a*. A first protrusion 42*d*1, which is annular and protrudes from the main surface on the sliding layer 41 side of the second flat plate portion 42*a* of the thick portion 42*d*, is disposed in the thick portion 42*d*. A second protrusion 42*d*2, which is annular and protrudes from the main surface of the second flat plate portion 42*a* of the thick portion 42*d* on the side opposite to the sliding layer 41 side, covers the first protrusion 42*d*1 in the axial direction and is wider than the first protrusion 42*d*1 in the radial direction.

The thick portion 42*d* and the thin portion 41*d* configures a sealing portion that comes into contact with the mouth portion 110 of the can container 100. The thickness of the thick portion 42*d* is set so that the difference between the thickness of the thick portion 42*d* and the thickness of the second flat plate portion 42*a* becomes larger than the depth of the thin portion 41*d* from the first flat plate portion 41*a*. That is, by setting the thickness of the first protrusion 42*d*1 to be the same as the depth of the thin portion 41*d*, and by forming the thick portion 42*d* further including the second protrusion 42*d*2, the sealing portion of the flat plate portion 12*a* of the sealing member 12 that comes into contact with the mouth portion 110 is configured to be thicker than the other portions of the flat plate portion 12*a*.

Specifically, the width of the first protrusion 42*d*1 in the radial direction is the same as the width of the thin portion 41*d*. That is, the first protrusion 42*d*1 has a width in the radial direction such that the first protrusion faces the base point of deformation of the top plate portion 21 at the time of performing drawing and faces the mouth portion 110 of the can container 100 in the axial direction, when the sealing member 12 is disposed in the cap body 11 and the cap 1 is placed on the mouth portion 110 of the can container 100. Specifically, the second protrusion 42*d*2 has a width in the radial direction such that the second protrusion faces the mouth portion 110 of the can container 100 in the axial direction when the sealing member 12 is disposed in the cap body 11 and the cap 1 is placed on the mouth portion 110 of the can container 100.

Here, the width of the first protrusion 42d1 in the radial direction and the width of the second protrusion 42d2 in the radial direction are appropriately set in consideration of the difference between the inner diameter of the cap body 11 and the outer diameter of the sealing member 12, the shrinkage rate of the resin material configuring the sliding layer 41 and the sealing layer 42 of the sealing member 12, the amount of deformation of the sliding layer 41 due to external forces, dimensional accuracy, and the like.

When the cap 1 is disposed in a state where the top plate portion 21 faces upward and the sealing member 12 falls below the top plate portion 21, the sealing member 12 comes into contact with end portions of the knurl portions 31 on the vent slit 31a side, whereby the sealing member 12 is locked by the knurl portions 31 and is restricted from moving downward in the direction of gravity. When the cap 1 is placed on the mouth portion 110 of the can container 100, the thick portion 42d of the sealing member 12 comes into contact with the mouth portion 110, and the thin portion 41d of the sealing member 12 is disposed so as to face the base point of deformation of the top plate portion 21 during drawing process of the corner portion 23.

Figure 5:
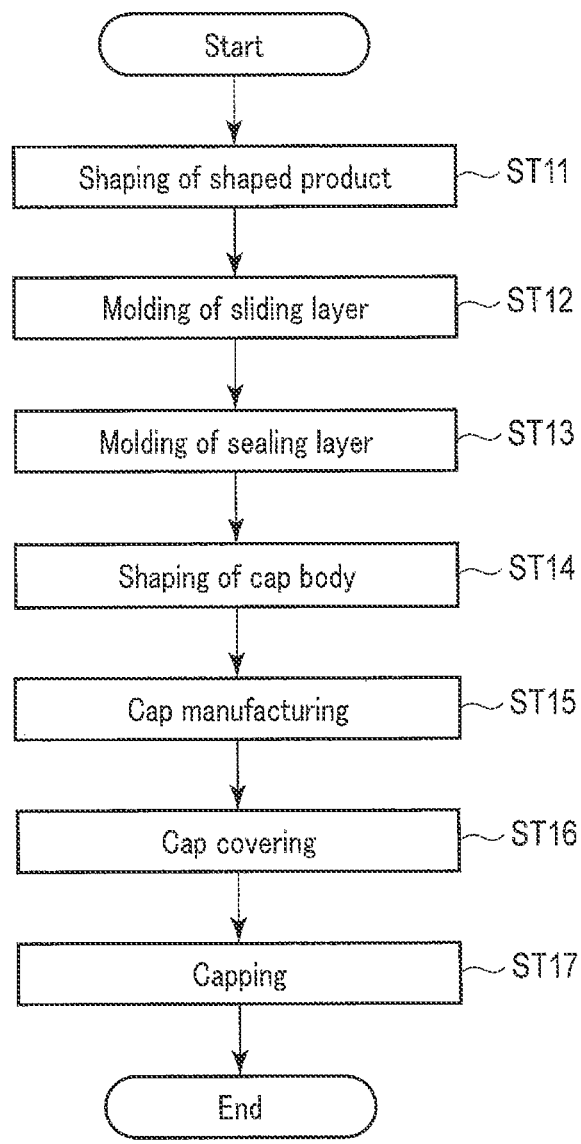
FIG. 5 is a flow chart showing a method of manufacturing the cap.

A method of manufacturing the cap 1 configured in the above manner will be described below with reference to FIG. 5 and FIG. 6. Since the female screw portion 33 provided in the cap body 11 is shaped when the can container 100 is capped with the cap 1, a method for manufacturing the cap 1, including a method for manufacturing a bottle-shaped can in which the cap 1 is attached to the can container 100 and the can container 100 is sealed, will be described.

First, for example, a metallic plate material having the above-described inner resin coating film formed on one main surface is processed, and a cup-shaped product is shaped from the metallic plate material (step ST11). This shaped product is the cap body 11 in which the knurl portions 31, the recesses 32, the female screw portion 33, and the tamper evidence band portion 34 are not formed. That is, the shaped product is configured by the top plate portion 21, the cylindrical skirt portion 22 in which the knurl portions 31, the recesses 32, the female screw portion 33, and the tamper evidence band portion 34 are not formed, and the corner portion 23.

Next, the sliding layer 41 is molded (step ST12). As a specific example, for example, the cap body 11 is disposed on a lower mold in a posture in which the top plate portion 21 is positioned on the lower side in the direction of gravity. A molten or softened resin material for the sliding layer 41 is then supplied onto the top plate portion 21, and the supplied resin material is compression-molded by an upper mold to mold the sliding layer 41.

Next, the sealing layer 42 is molded (step ST13). As a specific example, for example, a molten or softened resin material for the sealing layer 42 is supplied onto the sliding layer 41, and the supplied resin material is compression-molded by the upper mold to mold the sealing layer 42 on the sliding layer 41. By these steps, the sealing member 12 in which the sliding layer 41 and the sealing layer 42 are laminated is manufactured in the shaped product.

Next, the shaped product is processed to shape the cap body 11 (step ST14). As a specific example, the knurl portions 31, the vent slits 31a, the recesses 32, and the tamper evidence band portion 34 and the like are shaped in the skirt portion 22 of the shaped product. By this step, the cap body 11 is manufactured. When the cap body 11 is shaped, the sealing member 12 is removed from the shaped product.

The sealing member 12 is then inserted into the manufactured cap body 11 to manufacture the cap 1 (step ST15). Through these steps, the cap 1 is manufactured.

Next, a beverage or the like is filled in a separately manufactured can container 100. At this time, the can container 100 is in an upright posture in which the mouth portion 110 is positioned at an upper portion. Next, the can container 100 is covered with the cap 1 (step ST16). Specifically, the cap 1 is placed on the mouth portion 110 of the can container 100 with the top plate portion 21 facing upward.

When the cap 1 is in a posture in which the top plate portion 21 is placed upward, the sealing member 12 descends by a certain distance in a direction away from the top plate portion 21, the sealing member 12 is supported by the end portions of the knurl portions 31, and the descending movement of the sealing member 12 is restricted. When the cap 1 is placed on the mouth portion 110 in this state, the thick portion 42d of the sealing layer 42 of the sealing member 12 faces the mouth portion 110, and, as shown by ST16 in FIG. 6, the mouth portion 110 and the thick portion 42d come into contact with each other.

Next, the can container 100 is capped with the cap 1 by using a mold 200 of a molding apparatus (step ST17). As a specific example of capping, in a state where the cap 1 covers the mouth portion 110, the corner portion 23 is drawn, then the skirt portion 22 is roll-on shaped.

Here, the mold 200 includes a first mold 210 for drawing the corner portion 23, a second mold 220 for roll-on shaping the skirt portion 22, and a drive mechanism for driving the first mold 210 and the second mold 220. The first mold 210 includes a fixed mold 211 that comes into contact with the top plate portion 21 and a movable mold 212 that applies a load in the axial direction to the corner portion 23.

As shown in ST17 of FIG. 6, a specific example of capping using the mold 200 will be described. First, the top plate portion 21 is pressed by the fixed mold 211, and the mouth portion 110 is made to come into close contact with the sealing member 12. At this time, the sealing member 12 is in a state where the thick portion 42d is compressed on the sealing layer 42 by the mouth portion 110. In a state where the top plate portion 21 and the sealing member 12 are disposed between the mouth portion 110 and the fixed mold 211, the movable mold 212 applies a downward load in the axial direction to the corner portion 23, thereby shaping the corner portion 23 and drawing the corner portion 23 into a predetermined shape. In addition, by roll-on shaping the skirt portion 22 using the second mold 220, the female screw portion 33 corresponding to the shape of the male screw portion 112 of the can container 100 is shaped on the skirt portion 22.

After the shaping, by retracting the mold 200 from the cap 1, the cap 1 is fixed by seaming process on the mouth portion 110 of the can container 100, thereby completing the capping of the cap 1 (step ST18 in FIG. 6), and a bottle-shaped can filled with a beverage is manufactured.

According to the cap 1 configured as described above, the inner resin coating film of the cap body 11 is configured to contain the polyester-based resin and the lubricant. With this configuration, the opening performance of the cap 1 can be improved. When the hydrocarbon-based wax is used as the lubricant, it is possible to significantly reduce the opening torque of the cap 1 and significantly improve the opening performance of the cap 1. In addition, when the hydrocarbon-based wax is used in combination with the fatty acid ester-based wax as the lubricant, the 2nd torque of the cap 1 (that is, the torque at the time of breakage of the breaking portions 34a of the tamper evidence band portion 34 of the cap) can be further reduced and the opening performance of the cap 1 can be further improved compared to the case where the hydrocarbon-based wax is used alone.

<Preferable Embodiments>

Preferable embodiments are summarized below.

[1] A cap comprising:

a cap body including a top plate portion which is disk-shaped, and a skirt portion which is cylindrical and provided at a peripheral edge portion of the top plate portion, the top plate portion including a substrate and a resin coating film provided on a cap inner surface side of the substrate, the resin coating film including a polyester-based resin and a lubricant; and a sealing member provided in the cap body separately from the cap body so as to face the top plate portion, and having an outer diameter smaller than an inner diameter of the skirt portion.

[2] The cap according to [1], wherein the lubricant comprises a hydrocarbon-based wax.

[3] The cap according to [2], wherein the hydrocarbon-based wax is a polyethylene wax.

[4] The cap according to [2] or [3], wherein the lubricant further comprises a fatty acid ester-based wax.

[5] The cap according to [4], wherein the fatty acid ester-based wax is lanolin.

[6] The cap according to any one of [1] to [5], wherein the cap further comprises a plurality of locking portions provided in a circumferential direction of the skirt portion and configured to restrict a movement of the sealing member in a direction away from the top plate portion and support the sealing member.

[7] The cap according to [6], wherein the locking portions protrude inward in a radial direction from an inner peripheral surface of the skirt portion.

[8] The cap according to any one of [1] to [7], wherein the cap further comprises a plurality of restricting portions provided in a circumferential direction of the skirt portion and configured to restrict a movement of the sealing member in a radial direction.

[9] The cap according to [8], wherein the restricting portions protrude inward in the radial direction from an inner peripheral surface of the skirt portion.

[10] The cap according to [8] or [9], wherein the restricting portions are positioned closer to the top plate portion than a portion of each of the locking portions that comes into contact with the sealing member.

[11] The cap according to any one of [8] to [10], wherein the restricting portions each comprise an inclined surface configured so that an inner surface of the skirt portion is inclined in a direction away from the top plate portion in an axial direction and inclined inward in the radial direction.

[12] The cap according to [11], wherein a diameter of a tangent circle connecting lowermost ends of the plurality of inclined surfaces in an axial direction is set to be larger than a diameter of a tangent circle connecting innermost ends of the plurality of the locking portions in the radial direction.

[13] The cap according to any one of [1] to [12], wherein the sealing member is configured so that an outer peripheral edge is thinner than a sealing portion that comes into contact with a mouth portion of a container.

[14] The cap according to any one of [1] to [13], wherein the sealing member comprises:

a sliding layer disposed on the top plate portion side; and a sealing layer provided on a main surface opposite to the top plate portion side of the sliding layer and sealing a mouth portion of a can container.

[15] The cap according to [14], wherein the sliding layer is slidable with the top plate portion.

[16] The cap according to [14] or [15], wherein the sliding layer has a thin portion thinner than at least a center side and provided on an outer peripheral edge side.

[17] The cap according to [16], wherein the thin portion is provided at a position facing a base point of deformation of the top plate portion when a corner portion of the cap body is being formed by drawing.

[18] The cap according to [16] or [17], wherein the thin portion is provided at a position adjacent to a portion of the sealing layer facing the mouth portion in an axial direction when the cap is being attached to the can container.

[19] The cap according to any one of [16] to [18], wherein a portion of the sealing member facing the mouth portion is configured to be thicker than other portions of the sealing member.

[20] The cap according to any one of [16] to [19], wherein a portion of the sliding layer on a radially outer side of the thin portion is configured to be thicker than the thin portion.

WORKING EXAMPLES

The present invention will be described based on working examples below.

[Experiment 1]

In Experiment 1, the effect of addition of a lubricant to a cap inner surface coating film containing a polyester-based resin as a main component was examined.

[1] Manufacture of Bottle-Shaped Cans

Bottle-shaped cans of Examples 1 to 6 were manufactured as follows. The caps of the manufactured bottle-shaped cans have a structure shown in FIG. 1.

Example 1

A polyester-based resin coating material containing a polyethylene wax and lanolin as lubricants was used as an inner surface coating material of a cap. One main surface (the inner surface of the cap) of an aluminum alloy plate (0.23 mm thick) is baking-coated with the inner surface coating material in an amount of coating of 50 mg/dm$^2$. Printing was performed on the other main surface (the outer surface of the cap). The obtained metal plate was shaped into a cup-shaped cap body having a top plate portion and a skirt portion by drawing. The cap body had a height of about 18 mm and a weight of about 2.1 mg.

Using the cap body as a mold, a sealing member was manufactured as follows. A resin material constituting a sliding layer was supplied to an inner surface of a top plate portion of the cap body, a sliding layer was molded by the mold, a resin material constituting a sealing layer was supplied on the sliding layer, a sealing layer was molded by the mold, and a sealing member composed of the sliding layer and the sealing layer was manufactured.

The sealing member was removed from the cap body, knurl portions (reference numeral 31 in FIG. 1), recesses (reference numeral 32 in FIG. 1), and a tamper evidence band portion (reference numeral 34 in FIG. 1) were formed in the skirt portion of the cap body, and the sealing member was inserted into the cap body to manufacture the cap.

Capping of the cap to a container mouth portion was carried out as follows. A load was applied to the top plate portion of the cap body in a state in which the container mouth portion was covered with the cap so that a tip portion (curl portion) of the container mouth portion and the sealing layer of the sealing member were in contact with each other, and the skirt portion was roll-on shaped while drawing the corner portion downward. As a result, the cap was fixed by seaming process to the mouth portion of the container, and the bottle-shaped can of Example 1 was manufactured.

Example 2

A bottle-shaped can of Example 2 was manufactured in the same manner as in Example 1 except that a polyester-based resin coating material containing no lubricant was used as the inner surface coating material.

Example 3

A bottle-shaped can of Example 3 was manufactured in the same manner as in Example 1 except that a polyester-based resin coating material containing only lanolin as a lubricant was used as the inner surface coating material.

Example 4

A bottle-shaped can of Example 4 was manufactured in the same manner as in Example 1 except that a polyester-based resin coating material containing only a polyethylene wax as a lubricant was used as the inner surface coating material.

Example 5

A bottle-shaped can of Example 5 was manufactured in the same manner as in Example 1 except that a polyester-based resin coating material containing a polyethylene wax and lanolin as lubricants, in which the amount of lanolin added was reduced by 25% relative to that in Example 1, was used as the inner surface coating material.

Example 6

A bottle-shaped can of Example 6 was manufactured in the same manner as in Example 1 except that a polyester-based resin coating material containing a polyethylene wax and lanolin as lubricants, in which the amounts of the polyethylene wax and lanolin added were reduced by 25% relative to those in Example 1, was used as the inner surface coating material.

[2] Evaluation Method

The bottle-shaped cans of Examples 1 to 6 were evaluated in terms of the opening performance of the cap. The evaluation method is as follows.

(1) 1st Torque and 2nd Torque

The 1st torque is measured by fixing the body of the bottle-shaped can to a torque meter (TNK-50B-1 manufactured by NIDEC-SHINPO CORPORATION), holding the cap, and rotating the cap in the opening direction. The peak value of the torque when the cap starts moving from an original position at that time is referred to as "the 1st torque".

In the measurement of the 2nd torque, after the 1st torque is measured, the measured value of the torque meter is reset, and the cap is again rotated in the opening direction to sequentially break the breaking portions of the tamper evidence band portion. The peak value of the torque after the 1st torque until the cap is removed from the can container is referred to as "the 2nd torque".

(2) Opening Angle

To measure the opening angle, the cap is rotated in the opening direction from the closed state. The rotation angle of the cap when all the breaking portions of the tamper evidence band portion are broken is referred to as "the opening angle".

[3] Evaluation Results

The evaluation results are shown in Table 1.

TABLE 1

| | Lubricant | | Evaluation of cap opening performance | | |
|---|---|---|---|---|---|
| | Poly-ethylene wax | Lanolin | 1st torque [Ncm] | 2nd torque [Ncm] | Opening angle [°] |
| Example 1 | 100 | 100 | 79 | 106 | 196 |
| Example 2 | 0 | 0 | 177 | 166 | 200 |
| Example 3 | 0 | 100 | 139 | 144 | 218 |
| Example 4 | 100 | 0 | 79 | 117 | 205 |
| Example 5 | 100 | 75 | 83 | 107 | 206 |
| Example 6 | 75 | 75 | 83 | 105 | 222 |

In Table 1, the amount of each added lubricant is represented by a relative value, assuming that the amount (mass) of each added lubricant used in Example 1 is set to 100. In Table 1, the 1st torque refers to the peak value of torque at the start of rotation of the cap, and the 2nd torque refers to the peak value of torque at the time of breakage of the breaking portions of the tamper evidence band portion of the cap.

When the inner resin coating film of the cap body contained a lubricant together with the polyester-based resin, the opening performance of the cap could be improved (see Examples 1 to 6). When a polyethylene wax was used alone as a lubricant, the torque was significantly reduced, and the opening performance of the cap was significantly improved (see Examples 2 and 4). When a polyethylene wax and lanolin were used in combination as lubricants, the 2nd torque was further reduced and the opening performance of the cap was further improved as compared with the case where a polyethylene wax was used alone (see Example 1 and Examples 4 to 6).

[Experiment 2]

In Experiment 2, the effect of addition of a lubricant to a cap inner surface coating film containing a polyester-based resin as a main component was compared with the effect of addition of a lubricant to a cap inner surface coating film containing an epoxy phenol resin as a main component.

A bottle-shaped can of Example 7 was manufactured in the same manner as in Experiment 1 using a polyester-based resin coating material containing a polyethylene wax and lanolin as lubricants, as the inner surface coating material of the cap. A bottle-shaped can of Example 8 was manufactured in the same manner as in Experiment 1 using an epoxy phenol resin coating material containing a polyethylene wax and lanolin as lubricants, as the inner surface coating material of the cap.

The bottle-shaped cans of Examples 7 and 8 were evaluated in terms of the opening performance of the cap in the same procedure as in Experiment 1. In Experiment 2, the evaluation was performed after the manufactured bottle-shaped cans were stored at 55° C. for one day. The evaluation results are shown in Table 2.

TABLE 2

| | Coating film | | Evaluation of cap opening performance | | |
| --- | --- | --- | --- | --- | --- |
| | | | 1st torque | 2nd torque | Opening angle |
| | Resin | Lubricant | [Ncm] | [Ncm] | [°] |
| Example 7 | Polyester | Polyethylene wax | Lanolin | 87 | 85 | 212 |
| Example 8 | Epoxy phenol | Polyethylene wax | Lanolin | 149 | 111 | 206 |

When the inner resin coating film of the cap body contained a lubricant together with the polyester-based resin, the opening performance of the cap could be improved (see Example 7). On the other hand, when the inner resin coating film of the cap body contained a lubricant together with the epoxy phenol resin, the opening torque of the cap could not be sufficiently reduced (see Example 8). This difference appears to result from the fact that, as discussed above, the polyester-based resin has a lower cross-linking density than the epoxy phenol resin, and therefore the particulate wax can be stably retained on the surface of the resin coating film, and the molten wax present inside the resin coating film can be caused to seep out to the surface.

REFERENCE SIGNS LIST

1 . . . cap, 11 . . . cap body, 12 . . . sealing member, 12a . . . flat plate portion, 12b . . . curved surface portion, 21 . . . top plate portion, 22 . . . skirt portion, 23 . . . corner portion, 31 . . . knurl portion, 31a . . . vent slit, 32 . . . recess, 32a . . . inclined surface, 33 . . . female screw portion, 34 . . . tamper evidence band portion, 34a . . . breaking portion, 41 . . . sliding layer, 41a . . . first flat plate portion, 41b . . . first curved surface portion, 41c . . . protruding portion, 41d . . . thin portion, 41d1 . . . inclined surface, 41d2 . . . inclined surface, 42 . . . sealing layer, 42a . . . second flat plate portion, 42b . . . second curved surface portion, 42c . . . recess, 42d . . . thick portion, 42d1 . . . first protrusion, 42d2 . . . second protrusion, 100 . . . can container, 110 . . . mouth portion, 111 . . . jaw portion, 112 . . . male screw portion, 113 . . . curl portion, 200 . . . mold, 210 . . . first mold, 211 . . . fixed mold, 212 . . . movable mold, 220 . . . second mold

The invention claimed is:

1. A cap comprising:
a cap body including a top plate portion which is disk-shaped, and a skirt portion which is cylindrical and provided at a peripheral edge portion of the top plate portion, the top plate portion including a substrate and a resin coating film provided on a cap inner surface side of the substrate, the resin coating film including a polyester-based resin and a lubricant, the lubricant comprising a hydrocarbon-based wax and a fatty acid ester-based wax, wherein an amount of the hydrocarbon-based wax is 2% to 7% by mass with respect to an amount of the polyester-based resin; and
a sealing member provided in the cap body separately from the cap body so as to face the top plate portion, and having an outer diameter smaller than an inner diameter of the skirt portion.

2. The cap according to claim 1, wherein the hydrocarbon-based wax is a polyethylene wax.

3. The cap according to claim 2, wherein the fatty acid ester-based wax is lanolin.

4. The cap according to claim 3, wherein an amount of the lanolin is 2% to 7% by mass with respect to an amount of the polyester-based resin.

5. The cap according to claim 3, wherein the sealing member comprises:
a sliding layer disposed on the top plate portion side; and
a sealing layer provided on a main surface opposite to the top plate portion side of the sliding layer and configured to seal a mouth portion of a can container.

6. The cap according to claim 1, wherein the fatty acid ester-based wax is lanolin.

7. The cap according to claim 1, wherein an amount of the fatty acid ester-based wax is 2% to 7% by mass with respect to an amount of the polyester-based resin.

8. The cap according to claim 1, wherein the sealing member comprises:
a sliding layer disposed on the top plate portion side; and
a sealing layer provided on a main surface opposite to the top plate portion side of the sliding layer and configured to seal a mouth portion of a can container.

9. A cap comprising:
a cap body including a top plate portion which is disk-shaped, and a skirt portion which is cylindrical and provided at a peripheral edge portion of the top plate portion, the top plate portion including a substrate and a resin coating film provided on a cap inner surface side of the substrate, the resin coating film including a polyester-based resin and a lubricant, the lubricant comprising a hydrocarbon-based wax and a fatty acid ester-based wax, wherein an amount of the fatty acid ester-based wax is 2% to 7% by mass with respect to an amount of the polyester-based resin; and
a sealing member provided in the cap body separately from the cap body so as to face the top plate portion, and having an outer diameter smaller than an inner diameter of the skirt portion.

10. The cap according to claim 9, wherein the hydrocarbon-based wax is a polyethylene wax.

11. The cap according to claim 10, wherein the fatty acid ester-based wax is lanolin.

12. The cap according to claim 11, wherein the sealing member comprises:
a sliding layer disposed on the top plate portion side; and
a sealing layer provided on a main surface opposite to the top plate portion side of the sliding layer and configured to seal a mouth portion of a can container.

13. The cap according to claim 9, wherein the fatty acid ester-based wax is lanolin.

14. The cap according to claim 9, wherein the sealing member comprises:
- a sliding layer disposed on the top plate portion side; and
- a sealing layer provided on a main surface opposite to the top plate portion side of the sliding layer and configured to seal a mouth portion of a can container.

* * * * *